S. BREMNER & F. F. SLICK.
BELT SHIFTER.
APPLICATION FILED SEPT. 12, 1914.

1,169,232.

Patented Jan. 25, 1916.
3 SHEETS—SHEET 1.

WITNESSES
Chas. Josterman
R. D. Little

INVENTOR
S. Bremner
F. F. Slick
by C. C. Linthicum
his attorney

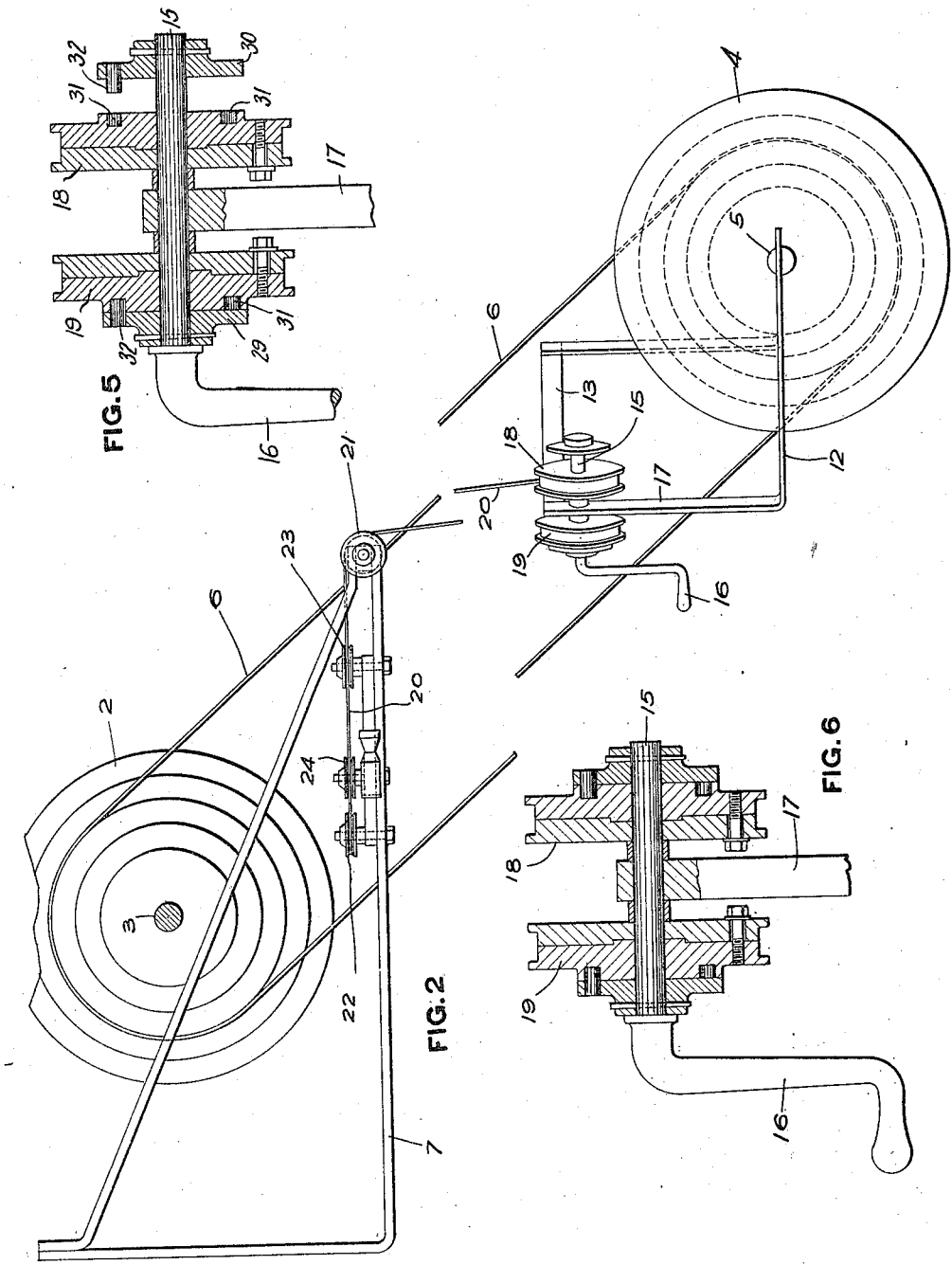

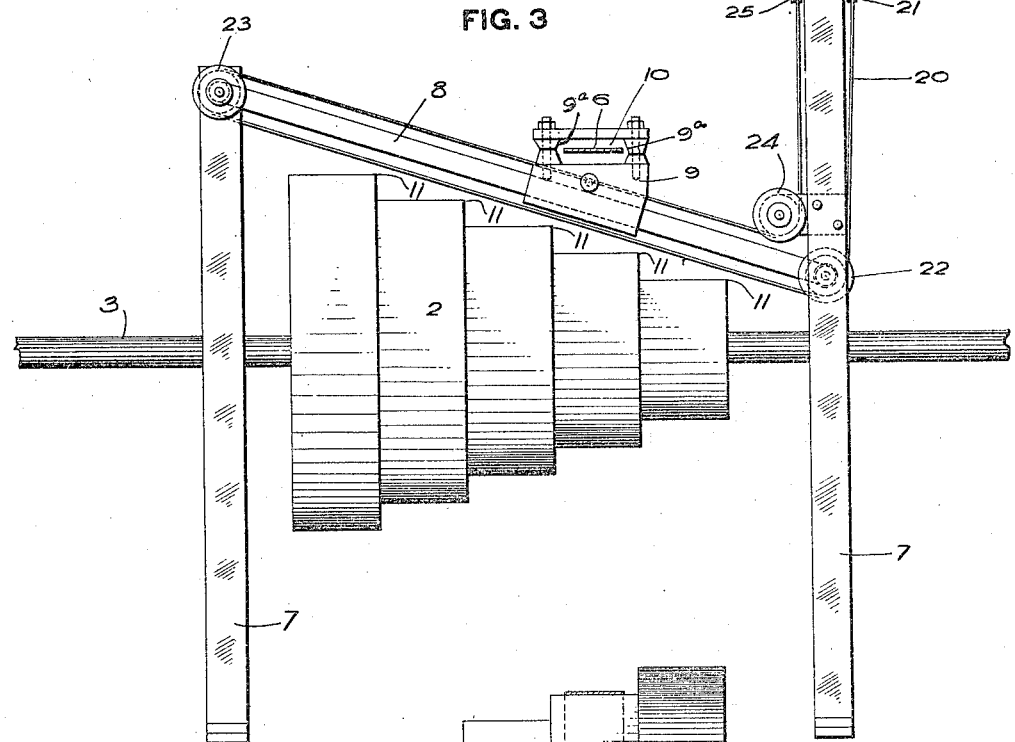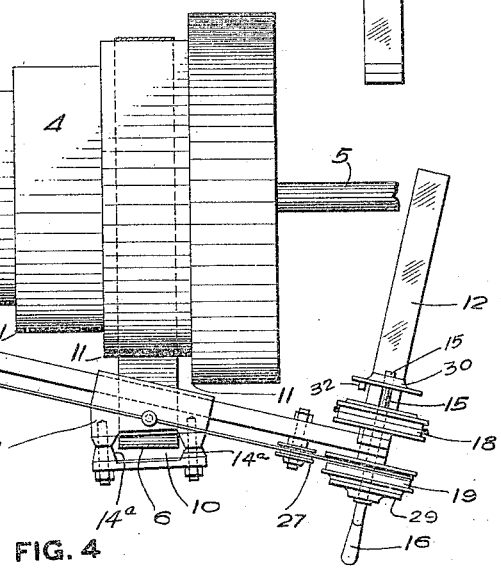

UNITED STATES PATENT OFFICE.

SIMON BREMNER AND FRANK F. SLICK, OF BRADDOCK, PENNSYLVANIA.

BELT-SHIFTER.

1,169,232. Specification of Letters Patent. Patented Jan. 25, 1916.

Application filed September 12, 1914. Serial No. 861,425.

*To all whom it may concern:*

Be it known that we, SIMON BREMNER, a subject of the King of Great Britain, and FRANK F. SLICK, a citizen of the United States, both residents of Braddock, in the county of Allegheny and State of Pennsylvania, have invented certain new and useful Improvements in Belt-Shifters, of which the following is a specification.

Our invention relates to the construction and arrangement of apparatus used in shifting the belts of belt drives, and more particularly relates to the construction and arrangement of belt shifters used in moving the belt of a drive employing cone or stepped pulleys, in shifting the belt from one to another of the steps of such pulleys to change the speed of the driven cone pulley.

One object of our invention is to provide a belt shifting mechanism for cone pulleys having novel means whereby the belt is moved from one to another, or from a large to a small step of the pulley, and vice versa.

Another object of our invention is to provide a belt shifting mechanism having novel means for shifting the belt of an overhead belt drive from the floor of a factory or shop in which the apparatus is installed.

A still further object of the invention is to provide a belt shifting mechanism having the novel combination and arrangement of parts more fully described hereinafter and specifically pointed out in the appended claims.

Figure 1:
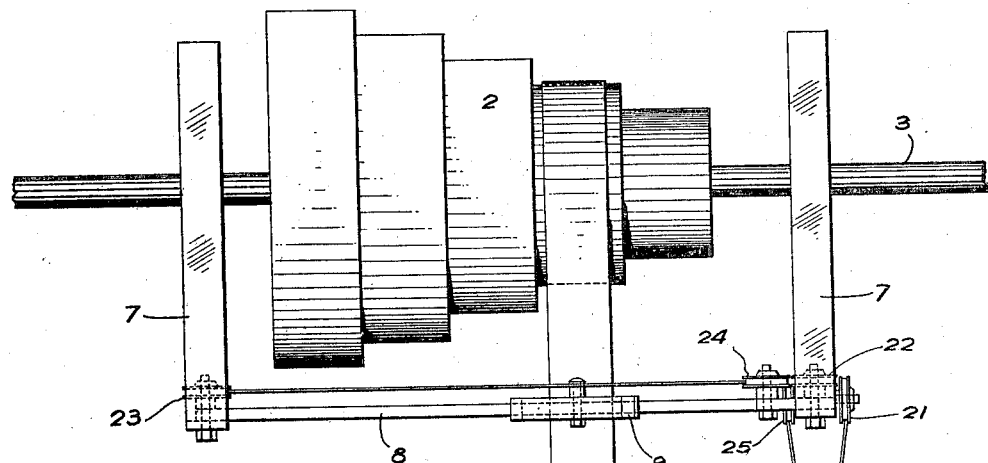
Figure 1:
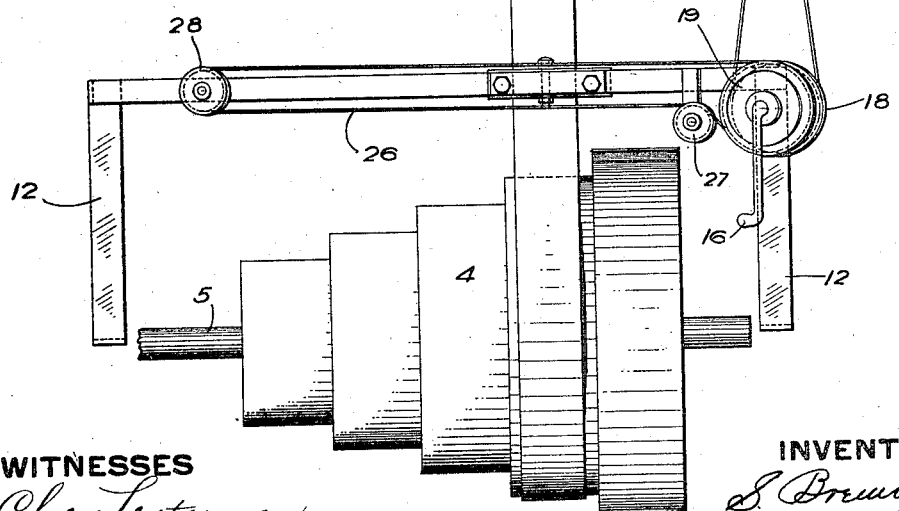

Referring to the drawings forming part of this specification, Figure 1 is a side elevation showing a cone pulley drive having an overhead driving pulley, as constructed and arranged in accordance with our invention. Fig. 2 is an end elevation of the apparatus shown in Fig. 1. Fig. 3 is a top plan of the overhead or driving pulley shown in Figs. 1 and 2. Fig. 4 is a top plan of the lower or driven pulley shown in Figs. 1 and 2. Fig. 5 is a sectional elevation showing the construction of the rope drums and crank preferably used in actuating the belt shifting mechanism. Fig. 6 is a sectional elevation similar to Fig. 5 showing a modified construction of rope drums and crank, also adapted for use with and forming part of our invention.

In the accompanying drawings, the numeral 2 designates an overhead, driven cone pulley mounted upon a shaft 3 which may be the line shaft of a factory or shop, driven by a suitable motor in the usual manner, or which may be an overhead counter-shaft mounted in bearings and driven through a belt by a line shaft or other suitable prime mover.

Below, and located in a vertical plane to one side of the pulley 2 is a similar cone pulley 4 which is mounted on the driving shaft 5 forming part of a machine tool or similar apparatus adapted to be driven by a belt drive. The pulleys 2 and 4 are connected by an endless belt 6, and the construction of the pulleys and belt not forming part of our invention the construction thereof is not further described.

Secured on suitable brackets 7, 7, adjacent to the cone pulley 2 is a slide 8 having a guide 9 movably mounted thereon. The guide 9 is made in sections and the sections are arranged to form a yoke or loop to provide an opening 10 therein through which one side of the belt 6 extends.

The ends 9ª of the so formed yoke or loop are beveled or rounded so as to engage with the edge of the belt and cause it to curl when shifting the belt and the slide 8 is positioned to extend lengthwise in a plane substantially parallel with a vertical plane coinciding with the outer corners 11, 11, of the steps of the pulley 2, the ends of the yokes or loops and the slides being arranged in this manner to facilitate the belt shifting operations in stepping the belt up and down on the cone pulleys.

Fastened to suitable brackets 12 adjacent to the bottom pulley 4 is a similar slide 13, this slide also extending lengthwise parallel, in a vertical plane, with a plane coincident with the corners 11, 11, of the steps of the cone pulley 4 and a guide 14 is movably mounted on this slide and is made in sections to form a loop or yoke having an opening 10 through which one side of the belt 6 extends, the opening having beveled or rounded ends 14ª formed in the same manner as has been described for the guide 9.

Positioned adjacent to one end of the lower slide 13 for the pulley 4 is a rotary shaft 15 having a crank 16 on one end thereof. The shaft 15 is mounted so as to be movable lengthwise in a suitable bearing stand 17, and pinned or otherwise fastened on the shaft, so as to be rotated thereby, are the flanges 29 and 30, and rotatably mounted on the shaft between the flanges and the bearing stand 17 are two rope drums 18 and 19, these drums, as shown, being made in sections to lessen the cost and facilitate the assembly thereof with a minimum amount of machine work.

The one face of the drums 18 and 19 is provided with a series of holes or recesses 31, and the adjacent faces of the flanges 29 and 30 have a pin 32 projecting outwardly so as to enter each of the series of holes 31. In the construction shown in Figs. 1, 2, and 4 and in detail in Fig. 5, the flanges 29 and 30 are positioned on the shaft 15 a sufficient distance apart to enable one of the drums 18 and 19 to be operatively engaged by the pin 32 while the other drum is disengaged so as to permit of one drum's being turned or rotated independently of the other, as will be explained. When desired, however, the flanges 29 and 30 will be located on the shaft 15 so that the pins 32 in the flanges 29 and 30 will always be in the holes 31 in the drums 18 and 19, as shown in Fig. 6, in such case the drums always turning in unison.

A wire rope or other flexible connection 20 is fastened by one end to the drum 18 and this flexible connection 20 passes upwardly and around the idler wheel 21 and around the idler wheels 22 and 23, 24 and 25, which are rotatably secured on the brackets 7, 7. The flexible connection 20 is also fastened at its other end to the drum 18, and is attached, at a suitable point in its length, to the guide 9 on the overhead slide 8. A similar flexible connection or rope 26 is attached by one end to the drum 19 and after passing around the idler wheels 27 and 28 is attached by its other end to the drum 19, and is also fastened at an intermediate point in its length to the guide 14 on the slide 13 for the lower cone pulley 4. In this way, as will be seen by reference to Figs. 1, 2, 4 and 5 of the drawings, the guide 9 for the top pulley 2 and the guide 14 for the lower pulley 4, are detachably connected to the crank 16 by which the guides are actuated in shifting the belt 6, so that either of the guides may be moved independently of the other by turning the crank, after shifting the shaft 15 lengthwise to connect the flange 29 with the drum 18 or flange 30 and drum 19. By operating the guides independently the belt 6 may be always moved from a large to a smaller step of the cone pulley and then moved from a small to a larger step of the other cone pulley in stepping up or stepping down the belt on the pulleys.

When the construction of Fig. 6 is employed the drums 18 and 19, and through the connecting mechanism the guides 14, 14, are simultaneously moved instead of separately and independently, as in the construction of Fig. 5, this construction being adapted for use with very long belts. As the slides 9 and 14 move in planes parallel with the corners of the cone pulleys the belt 6 is readily shifted either to a larger or a smaller step.

In the operation of our improved apparatus, to move the belt from one to a smaller step on the driving pulley 2, the parts being assembled as shown in Figs. 1, 2, 4 and 5, the operator moves the shaft 15 until the pin 32 in the flange 29 is within one of the holes 31 in the face of the drum 18. The crank 16 is then turned so as to rotate the drum, and, through the flexible connection 20, the position of the guide 9 on the slide 8 is shifted. This movement of the guide 9 causes the edge of the belt 6 to curl when engaged by the adjoining end 9ª of the loop or yoke 10 through which the belt passes, and the belt is easily moved from one step to a smaller step of the driving cone pulley 2 on the shaft 3. The shaft 15 is then moved to position the pin 32 on the flange 30 into one of the holes 31 in the drum 19 and when the crank is then turned the guide 14 is moved on the slide 13 to shift the belt from a small to a larger step on the driven pulley 4.

When it is desired to step the belt up on the driving pulley 2 the operation is reversed, the belt 6 being first moved from a large to a smaller step on the driven pulley 4 and then moved from a small to a larger step on the driven pulley 2.

With the crank and pulley construction of Fig. 6, which is to be used with extremely long belts, both of the drums 18 and 19 are rotated when the crank 16 is turned, as will be readily understood.

The advantages of our invention will be apparent to those skilled in the art.

The apparatus is simple, and is cheaply constructed and easily kept in repair. By its use belts connecting cone pulleys are readily shifted without the necessity of using a belt shifting stick and without liability of injury to the operator.

Modifications in the construction and arrangement of the parts may be made without departing from our invention. The slides may be disconnected so as to be operated by separate and independent cranks, when desired, the means employed in operating the guides may be changed, and other variations may be made in the construction and arrangement of the parts, without departing from our invention as defined in the appended claims.

We claim:—

1. A belt shifter comprising a belt, cone pulleys connected by said belt, guides for moving the belt from one to another of the steps of the driving and the driven cone pulley, slides on which the guides are movably mounted, said slides extending lengthwise parallel to planes coincident with a line touching the corners of the steps of said pulleys, flexible connections extending between said guides, drums to which the flexible connections are fastened, and a crank shaft on which the drums are rotatably mounted, said shaft having means whereby the guides are moved separately and independently in shifting the belt on said pulleys.

2. A belt shifter comprising a belt, cone pulleys connected by said belt, guides for moving the belt from one to another of the steps of the driving and the driven cone pulley, slides on which the guides are movably mounted, said slides extending lengthwise parallel to planes coincident with a line touching the corners of the steps of said pulleys, flexible connections extending between said guides, drums to which the flexible connections are fastened, and a crank shaft on which the drums are movably mounted, said shaft having means for actuating the drums in moving the guides.

In testimony whereof, we have hereunto set our hands.

SIMON BREMNER.
FRANK F. SLICK.

Witnesses:
ALBERT J. LIMBACHER,
JAMES S. SCHWEINBERG.